Patented Sept. 6, 1927.

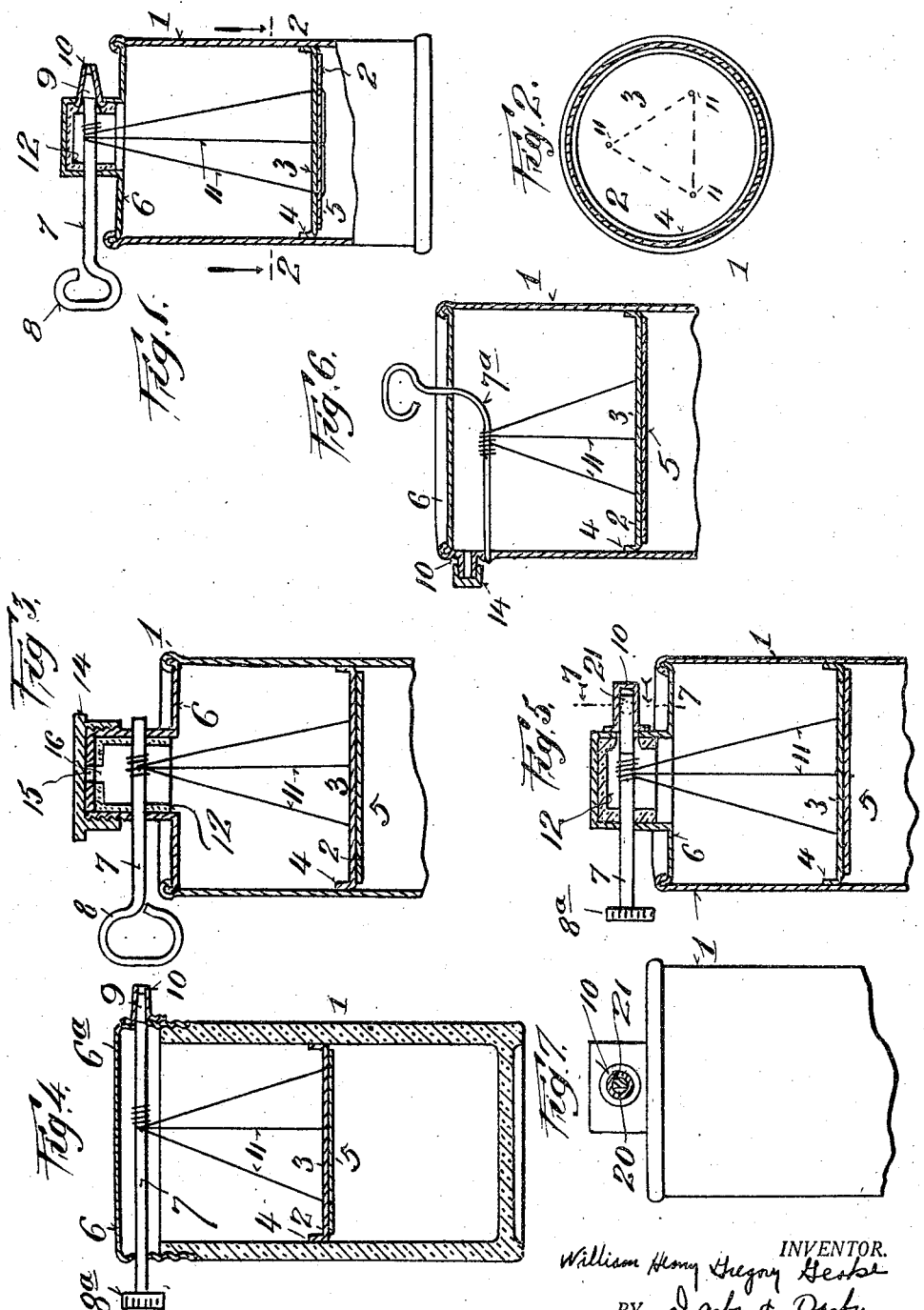

1,641,671

UNITED STATES PATENT OFFICE.

WILLIAM HENRY GREGORY GEAKE, OF KILLARA, SYDNEY, AUSTRALIA, ASSIGNOR OF ONE-HALF TO WALTER RUTHERFORD, OF LONDON, ENGLAND, AND JOHN BAIN, OF OTTAWA, CANADA.

SEMIFLUID-DISPENSING DEVICE.

Application filed November 14, 1925. Serial No. 69,117.

This invention relates to dispensing devices, and particularly such devices as are used for dispensing semi-fluid material such as paste, soft gum or the like. The object of the invention is to provide a container and means for dispensing the contents thereof, which is simple in structure, economical of manufacture and efficient in operation.

A further object of the invention is to provide a device of the character set forth, which permits the discharge of the material to be dispensed with the greatest ease, and in any desired quantity.

A further object of the invention is to provide means which are simple in structure, which facilitate the discharge of the material from its container, and insures the practical utilization of all of the material to be dispensed.

A further object is to provide means for preventing the deterioration of the material to be dispensed, due to exudation, evaporation or similar effects caused by being exposed to atmosphere.

Further objects of the invention will appear more fully hereinafter.

The invention consists substantially in the construction, combination, location and relative arrangement of parts, all as will be hereinafter more fully set forth, as shown by the accompanying drawings, and finally pointed out in the appended claims.

Referring to the drawings:

Fig. 1 is a view in side elevation and partially in central longitudinal section, showing a container embodying my invention.

Fig. 2 is a sectional view taken on the line 2—2, Fig. 1, and looking in the direction of the arrows.

Fig. 3 is a fragmentary view similar to that of Fig. 1, showing the top portion of a slightly modified container embodying my invention.

Figs. 4, 5 and 6 are similar views of still further modified constructions embodying my invention.

Fig. 7 is a sectional view taken on the line 7—7, Fig. 5, looking in the direction of the arrows.

The same part is designated by the same reference character wherever it occurs throughout the several views.

It is among the special purposes of my present invention to provide an exceedingly simple but efficient means for expelling the semi-fluid contents of a container.

While I do not desire to be limited or restricted to any particular content or similar fluid material, one particular industry to which the invention is especially adaptable, and which illustrates the advantages to be derived from the choice of a container or dispensing device incorporating the features of my invention is that of the dispensation of tooth paste, shaving cream, etc.

The invention may be as readily employed with the same or additional advantages, however, in connection with any material of a semi-fluid or plastic character.

Referring to the drawings, reference character 1 designates a container which may be of any suitable material such as any suitable metal, glass, fibre, wood, alloy, or the like. I prefer to employ a glass container but I do not desire to be limited or restricted in this respect.

The container is filled with the material to be dispensed. The container is provided with a plunger which, for the purposes of description, I will refer to as an expulsion disk designated at 2. It will be understood that the container 1 may be of any desired shape, and that the expulsion disk 2 will conform in shape to that of the container. The disk is so formed as to come in close contact with the inner peripheral wall of the container. I do not desire to be limited or restricted as to any particular type or material in the disk. In practice I prefer, however, to employ a cup shaped disk consisting of a cup portion 3 provided with the annular flange 4, and a metal plate backing 5. A reinforcing plate 5 serves to strengthen the disk under the compression pressure of the material contained thereabove. The annular flange 4 serves as a guide to insure constant alignment of the disk within the receptacle. The cup portion may be of any suitable material such as paper, fibre, leather, tinfoil, celluloid or the like. It is understood, of course, that it should be of sufficient rigidity to maintain constant contact with the interior wall of the container.

The top of the container in the form shown in Fig. 1 to which, however, I do not desire to be limited or restricted, consists of a cap 6 which is suitably secured to the wall of the container in any desired manner. In the form shown in this figure, it is seamed to the side walls of the container in the usual well known manner. The cap 6 is extended above the edge of the wall of the container, and a rod 7 provided with a handle 8 extends across the approximate center of the cap with the end 9 thereof projected in to the nozzle 10. The nozzle 10 is preferably cone-shaped, so that when the shaft 7 is pressed thereinto, the nozzle 10 is completely closed off to prevent air from the outside reaching the material or the material accidentally or otherwise being forced from the container. The expulsion disk 2 has secured thereto a number of wires 11 of any suitable material, which wires are secured to the shaft 7 so that when the handle 8 is turned, it serves in effect as a windlass to draw expulsion disk 2 upwardly, and thereby force the material contained in the container above the disk upwardly through the discharge nozzle 10. Any desired number of wires 11 may be employed. I find in practice that three wires are sufficient in which event it is preferable to locate the same at equal distances on the disk so that the pressure exerted by the windlass action of the shaft 7 is equal throughout the substantial area of the disk. To prevent the material from being forced out through the bearing for the shaft 7, I find it preferable, although I do not desire to be limited in this respect, to employ a washer 12 which may be of any suitable compressible material, such as rubber, cork, or the like.

I do not desire to be limited to any particular location of the discharge nozzle; for example, instead of the discharge nozzle illustrated in Fig. 1, I may employ a discharge orifice in the top of the cap 6, which in turn may be provided with a removable cap 14. In this event, the top of the cap 6 is provided with an orifice 15, and where a washer 12 is employed, a registering orifice 16 is provided therethrough. Likewise, if desired, both types of discharge nozzle may be employed, in a single device, if desired.

Similarly, I do not desire to be limited or restricted to the particular type of cap employed. For example, instead of employing the seamed type of cap, as illustrated in Fig. 1, the removable type of cap 6ª may be employed, as illustrated in Fig. 4, or the screw cap 6ᵇ shown in Fig. 4 may be employed.

Likewise, it is not necessary to employ a cap with a diameter smaller than that of the container. For example, as shown in Fig. 4, the cap in this instance is of the same diameter as the container and the shaft 7 then extends entirely across the container.

I do not desire to be limited or restricted to any particular type of handle 8. One simple arrangement is that illustrated in Figs. 1 and 3, wherein the handle is in fact the combination of the shaft merely being bent around upon itself in the familiar form of a metallic key. However, any suitable type of handle may be employed. For example, in Figs. 4 and 5, the handle consists of a knurled or other type knob 8ª.

It is not necessary to permit sliding, transverse movement of the shaft 7 in its bearings. In the arrangement shown in Figs. 5 and 7, the shaft 7 fits snugly in the nozzle 10, which in this instance is a cylindrical shape as distinguished from the cone-shaped nozzle 10 illustrated in the remaining figures. One face of the shaft is flattened as shown at 20, and the discharge orifice in the nozzle 10 is shown at 21, so that the material can be discharged through the nozzle 21 only when the flattened surface of the shaft 20 is adjacent the orifice 21—in other words, after it has been rotated approximately 180° from the position shown in Fig. 7.

Another way of eliminating a transverse movement of the shaft 7 where it is desired to do so, is to employ a bent rod 7ª, as illustrated in Fig. 6, the same extending up through the top of the container back or not as may be necessary, the operation remaining the same as originally described. Any of the nozzles illustrated in Figs. 1, 3, 4 and 6, may, if desired, be provided with a removable cap 14 wholly independently of whether or not the shaft 7 is permitted to slide longitudinally in its bearings.

Many further modifications and changes in details will readily occur to those skilled in the art without departing from the spirit and scope of my invention as defined in the claims. Therefore, while I have shown and described various structures embodying the principles of my invention, I desire to have the same regarded in an illustrative sense rather than in a limited sense; but having now set forth the objects and nature of my invention, and having shown and described various modifications thereof, what I claim as new and useful, of my own invention, and desire to secure by Letters Patent is:

1. In a dispensing device for semi-fluid material the combination with a container for containing the semi-fluid material, a liftable disk located in said container under the material therein contained, a rotatable shaft extending across a portion at least of said container, and operable from the outside thereof, a nozzle for said container forming one bearing for said shaft and a plurality of flexible connections between said shaft and said disk whereby when said shaft is rotated said disk is drawn upwardly as and for the purpose described said shaft forming a closure for said nozzle.

2. In a dispensing device for semi-fluid material the combination with a container for containing the semi-fluid material having a nozzle, a liftable disk located in said container under the material contained therein, a rotatable shaft extending across a portion at least of said container, and operable from the outside thereof, and a plurality of flexible connections between said shaft and said disk whereby when said shaft is rotated said disk is drawn upwardly as and for the purpose described, and whereby said shaft may be moved to shut off said nozzle when said container is not in use.

3. A device of the character described comprising a container, a cover for said container, a liftable disk extending transversely of said container, a rotatable shaft extending transversely through said cover, a plurality of wires extending between said shaft and said disk, and a nozzle in said cover, into which one end of said shaft extends to form a closure for the nozzle when stationary, said parts being so associated that the contained paste is forced out through said nozzle when said shaft is rotated.

4. A device of the character described comprising a container, a cover for said container, a liftable disk extending transversely of said container, a rotatable shaft extending transversely through said cover, and having one side flattened at one end, a closed hollow projection having a hole therein on said cover, into which the flattened end of said shaft extends, so that at each rotation of said shaft, a given quantity of material is forced out through said hole by reason of the movement of said disk.

In testimony whereof I have hereunto set my hand on this 10th day of November, A. D. 1925.

WILLIAM HENRY GREGORY GEAKE.